Sept. 13, 1938.   A. P. DE SEVERSKY   2,129,824
AIRCRAFT STRUCTURE
Filed Nov. 1, 1937
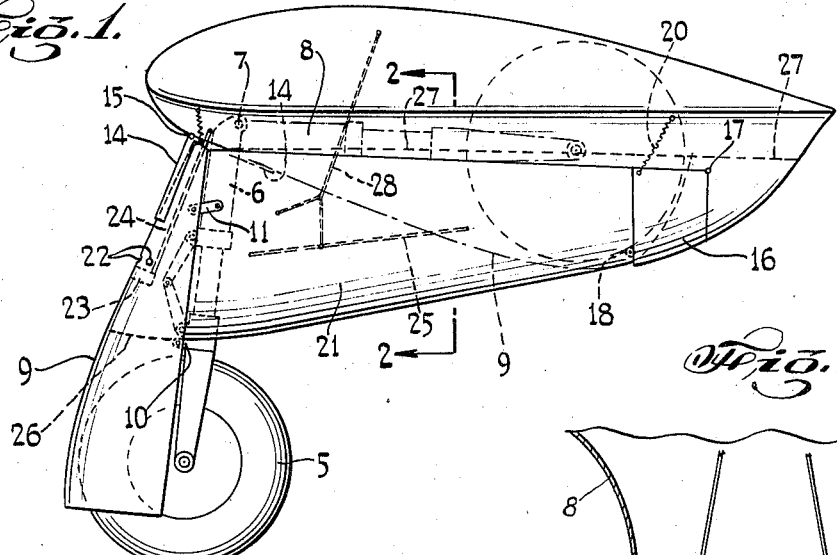
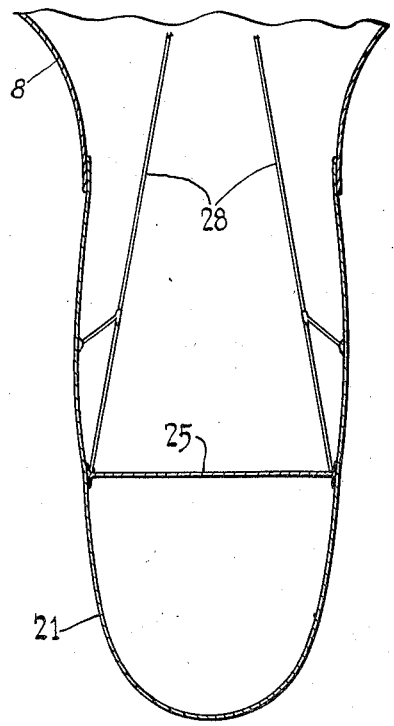
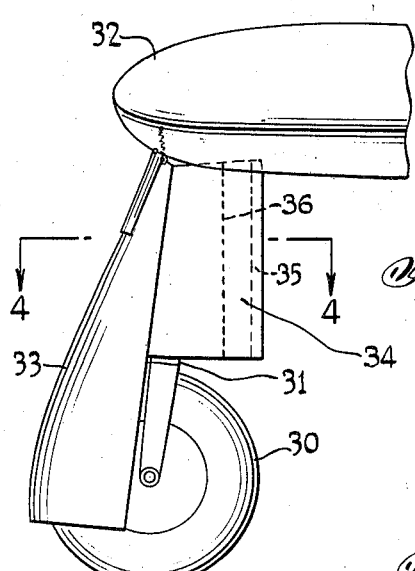
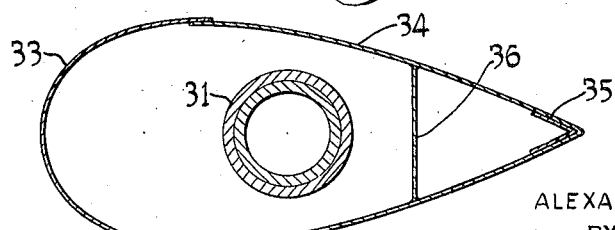
INVENTOR:
ALEXANDER P. de SEVERSKY
BY:
Robert C. Lasche
ATTORNEY.

Patented Sept. 13, 1938

2,129,824

UNITED STATES PATENT OFFICE

2,129,824

AIRCRAFT STRUCTURE

Alexander P. de Seversky, Asharoken Beach, Northport, N. Y., assignor to Seversky Aircraft Corporation, a corporation of Delaware Application November 1, 1937, Serial No. 172,156

11 Claims. (Cl. 244—102)

The present invention relates to aircraft landing gear and has for an object to provide a construction for retractable landing gear which will effectively streamline the airflow around the wheel, struts, etc. of the landing gear, both when the landing gear is in retracted position and when it is in projected position.

The landing gear of the present invention is adapted to be most commonly retracted into a recess in the wing, but it is also contemplated to retract it into another part of the aircraft body structure, such as the fuselage or a nacelle around an engine positioned in the wing at a distance from the fuselage.

The nature and other objects of the invention will be better understood from a description of a particular embodiment presented by way of example only, for the purpose of which description reference should be had to the accompanying drawing forming a part hereof and in which—

Figure 1 is a side view of a retractable landing gear embodying the invention,

Figure 2 is a sectional view taken on the line 2—2 of Fig. 1,

Figure 3 is a side view of another embodiment of the invention, and

Figure 4 is a sectional view taken on the line 4—4 of Fig. 3.

The illustrative embodiment shown in Figs. 1 and 2 is shown as applied to a landing gear of the type in which a landing wheel 5 is carried by a shock absorbing strut 6 pivoted at the forward portion of an airplane wing, as at the point 7 on a wing spar. The strut and wheel are indicated as retractable into a recess in the wing. In the particular structure shown, the wing is formed with a depending hollow housing or casing 8 which is formed to receive the strut 6 and part of the wheel, and when the landing gear is retracted, the recess is closed by a substantially rigid streamline fairing member 9, preferably constructed of metallic material and which is carried on strut 6 to move with the strut 6. As shown, the fairing member 9 is attached to the strut 6, on each side thereof, by brackets 10 and 11. The lower bracket 10 forms a substantially rigid connection between the fairing and the wheel yoke but the upper bracket 11 is pivoted, or otherwise flexibly connected, to both the fairing and the strut, in such a manner that the fairing is held substantially in position shown during the vertical movement ensuing when the strut is compressed, on landing, by the load of landing. At the forward end of the rigid fairing 9 a plate 14 is hinged as at 15, in the housing front surface to maintain the closure of the recess complete when the member 9 moves away, at its upper edge in retracting. This plate is spring-pressed to closed position, but on the downward movement of the fairing 9, it continues to cover the opening between the member 9 and the socket-member 8. In the housing for the landing gear when retracted, is an overlapping section 16 which is hinged or otherwise pivoted, at 17, and carries, at its forward lower edge, a roller 18. When the landing wheel moves into the recess, it engages the roller 18 and forces this pivoted section downwardly and rearwardly to permit the wheel to pass, into the wing recess, after which the section is automatically retracted into its closed position by a spring 20.

In accordance with the present invention, between the rigid fairing 9 and the housing 8 (including the hinged section 16), there is provided a hollow flexible member 21, which may be constructed of silk, canvas, or the like. Holes 22 are provided in the rigid fairing member 9 to admit an amount of the air stream sufficient to inflate the flexible member 21, when the wheel 5 is in projected landing-position, into suitable streamline shape, by the action of the relative wind. Suitable means is provided for closing these holes during the retraction of the landing gear, to collapse the flexible fairing as it is retracted. The means shown, for the purposes of illustration, comprise a curved valve plate 23, movable suitably to close the holes, and a link 24 connected at one end to the housing and at the other, to the plate, to thereby cause movement of the plate to closing position by the retraction of the landing gear. In order to define and hold the desired shape for the member 21 a transverse sheet 25 is provided to extend from side to side of the fairing, for at least a portion of its length and is secured thereto as shown.

Within the rigid fairing member 9 a diaphragm 26 is provided to form a closure at the bottom of the fairing sufficient to cause the air entering at 22 to enter and inflate the flexible, collapsible member 21.

The connections of the edges of the members 21 to the edges of the well or housing 8 are so arranged that, upon retraction of the landing wheel, the member 21 will be pushed up into the housing 8 and the wing, the rigid member 9 then constituting the fairing for the landing gear. To this end, the member 21 is secured within the rigid housing 8 substantially along the line 27, which line is so positioned, etc. that when pushed up by the retracted wheel, the member 21 will not be torn. Any suitable means may be provided for further controlling the member 21, such as movable folding devices or elastic members, and for the purposes of illustration, rubber cords 28, tensed when the member 21 is expanded, are shown as connected to the walls of the fairing and to the interior of the wing to positively draw the member 21 into the housing 8 during retraction of the landing gear.

The embodiment shown in Figs. 3 and 4 provides a somewhat different form of construction for a retractable landing gear. As here shown the landing wheel 30 is carried by a strut 31 pivoted to the wing 32. A rigid forward fairing 33, similar to the fairing 9, is carried by the strut. A member 34, made of material of a substantial degree of stiffness and yet of sufficient flexibility to permit the necessary degree of collapsing when the landing wheel is retracted, is secured at its forward edges to the fairing 33, in the manner indicated in Fig. 4. The member 34 may be, for example, constructed of a canvas impregnated with oil, shellac or the like, to provide the desired stiffness. As shown, the member is constructed to provide quite an overlap or edge at its rear portion and it is reinforced at this point by an angle member 35 to hold it in this shape. A transverse web member 36, similar to the web 25, is provided to hold the two sides at substantially the correct spacing. The relative wind entering member 33 will tend to hold the member 34 in the necessary streamlining shape, and it need not be closed at the top and bottom, but it may be, if desired. When the landing-gear is retracted, and the member 34 therefore collapsed, the member 33 constitutes the streamlining for the landing gear, similarly to the mode shown in Fig. 1.

The foregoing particular description is illustrative merely and is not intended as defining the bounds of the invention, which is limited in its embodiments only by the scope of the subjoined claims.

I claim:

1. In an aircraft, the combination with a structure having a recess in its under side, of a support and a landing wheel carried thereby, said support being attached to the said structure and movable upwardly and rearwardly into the recess, a rigid fairing member carried at the forward side of said support and a collapsible fairing member connected to said rigid fairing member to constitute a streamline-form rearwardly of said rigid fairing member, said collapsible fairing member being retractable into the strut receiving recess when the strut is retracted into said recess.

2. In an aircraft, the combination with a structure having a recess in its under side, of a strut and a landing wheel carried thereby, said strut and wheel being retractable into said recess, a rigid streamline fairing element carried at the forward side of said strut and partially surrounding said strut and wheel, a collapsible fairing element attached to said rigid fairing element and extending rearwardly on opposite sides of said strut and forming a continuation of the streamline of said fairing, both when the strut is retracted and when it is extended, said collapsible fairing element being retractable into the recess when said strut and wheel are retracted.

3. In an aircraft, the combination with a structure having a recess in its under side, of a strut and a landing wheel carried thereby, said strut being pivoted to the body of the aircraft for movement in a fore and aft plane to projected landing position and to retracted position in said recess, a rigid fairing member forward of said strut and movable therewith, and a flexible collapsible fairing attached to said rigid fairing and retractable into said recess when said strut is retracted into the recess.

4. In an aircraft, the combination with a wing structure having a recess in its under side, of a strut and a landing wheel carried thereby, said strut being pivoted to the wing and movable upwardly and rearwardly into the recess, a rigid fairing member carried at the forward side of said strut and a collapsible fairing member connected to said rigid fairing member to continue a streamline form rearwardly of said fairing member, said rigid fairing member being formed to constitute a partial closure for said recess, and fairing elements secured to said aircraft body to cooperate with said rigid fairing to provide a complete streamline closure for said recess including a closure section hinged to said aircraft body rearwardly of the position of the wheel when retracted into the recess, said closure section being arranged to be moved downwardly and rearwardly by said wheel in its retracting movement to permit passage of said wheel into said recess.

5. In an aircraft, the combination with a body structure having a recess in its under side of a strut and a landing wheel carried thereby, said strut being pivoted to the body structure and movable upwardly and rearwardly into the recess, a rigid fairing member carried at the forward side of said strut and a collapsible fairing member connected to said rigid fairing member to continue a streamline form rearwardly of said fairing member, said rigid fairing member being formed to constitute a partial closure for said recess, and fairing elements secured to said aircraft body to cooperate with said rigid fairing to provide a complete streamline closure for said recess including a closure section hinged to said aircraft body rearwardly of the position of the wheel when retracted into the recess, said closure section being arranged to be moved downwardly and rearwardly by said wheel in its retracting movement to permit passage of said wheel into said recess, said collapsible fairing being secured to said forward rigid fairing member and to said hinged fairing member to form therewith a continuous streamline fairing when the landing wheel is in projected position.

6. In an aircraft, the combination with a body structure having a recess in its under side of a strut and a landing wheel carried thereby, said strut being pivoted to the body structure and movable upwardly and rearwardly into the recess, a rigid fairing member carried at the forward side of said strut and a flexible element secured to the rear edges of said rigid fairing member and inflatable by the relative wind to form a streamline for said landing gear and extending rearwardly from the fairing to continue the fairing for said strut, said flexible fairing being retractable into said recess when said wheel is retracted, said rigid fairing having an aperture to permit entrance of air in a quantity sufficient to inflate said flexible fairing during flight.

7. In an aircraft, the combination with a body structure having a recess in its under side of a strut and a landing wheel carried thereby, said strut being pivoted to the body structure and movable upwardly and rearwardly into the recess, a rigid fairing member carried at the forward side of said strut and a flexible inflatable streamline fairing element secured to the rear edges of said rigid fairing member and extending rearwardly therefrom to form therewith a streamline fairing for said strut, said flexible fairing being retractable into said recess when said wheel is retracted, said rigid fairing having an aperture to permit entrance of air in a quantity sufficient to inflate said flexible fairing during flight, and means for closing said aperture when the strut is retracted.

8. In an aircraft, the combination with a body structure having a recess in its under side of a strut and a landing wheel carried thereby, said strut being pivoted to the body structure and movable upwardly and rearwardly into the recess, a rigid fairing member carried at the forward side of said strut and a flexible inflatable streamline fairing element secured to the rear edges of said rigid fairing member and extending rearwardly therefrom to form therewith a streamline fairing for said strut, said flexible fairing having a transverse element therein adapted to restrict the bulging of the flexible fairing when inflated.

9. In an aircraft, a structure having a recess in its underside, a landing-gear pivoted to the structure for swinging into said recess, a rigid, fixed-shape fairing member carried by the forward side of said strut, an angle member carried by the first-mentioned structure, a web member carried by the first-mentioned structure forwardly of the angle, and a flexible member secured at its forward edges to said rigid member and extending rearwardly therefrom over said web and said angle and inflatable by the relative wind to continue the streamline of said rigid fairing rearwardly of the landing gear, and being collapsible, when the landing gear is retracted, the rigid member then forming the streamline fairing for the retracted landing gear.

10. In an airplane, a part thereof normally housed in the airplane substantially out of airflow when the airplane is in flight and extensible into airflow for supporting the airplane when same is alighting or running, and means for substantially eliminating the drag of the said extended member, comprising another member associated with said extensible member normally in collapsed condition and distensible by the very influence that tends to cause drag into a streamlined surface trailing said extended member.

11. In an airplane, a landing-gear member normally housed in the airplane out of airflow but extensible on occasion into airflow for alighting and running purposes, a substantially rigid fairing member carried on the forward side of said extensible member, another fairing-member connected to the aft side of said extensible member normally in a collapsed condition and extensible by the extension of said extensible member into a streamlining form aft of said extended extensible member to thereby substantially eliminate the drag of said extended member.

ALEXANDER P. DE SEVERSKY.